July 17, 1962   J. PICANOL   3,044,365
MACHINES FOR CUTTING BEVEL, HYPOID AND SIMILAR GEARS
Filed Aug. 11, 1958   4 Sheets-Sheet 1

INVENTOR
JAIME PICANOL
BY Richards & Geier
ATTORNEYS

July 17, 1962  J. PICANOL  3,044,365
MACHINES FOR CUTTING BEVEL, HYPOID AND SIMILAR GEARS
Filed Aug. 11, 1958  4 Sheets-Sheet 2

INVENTOR
JAIME PICANOL

BY *Richards & Geier*
ATTORNEYS

July 17, 1962  J. PICANOL  3,044,365
MACHINES FOR CUTTING BEVEL, HYPOID AND SIMILAR GEARS
Filed Aug. 11, 1958  4 Sheets-Sheet 3
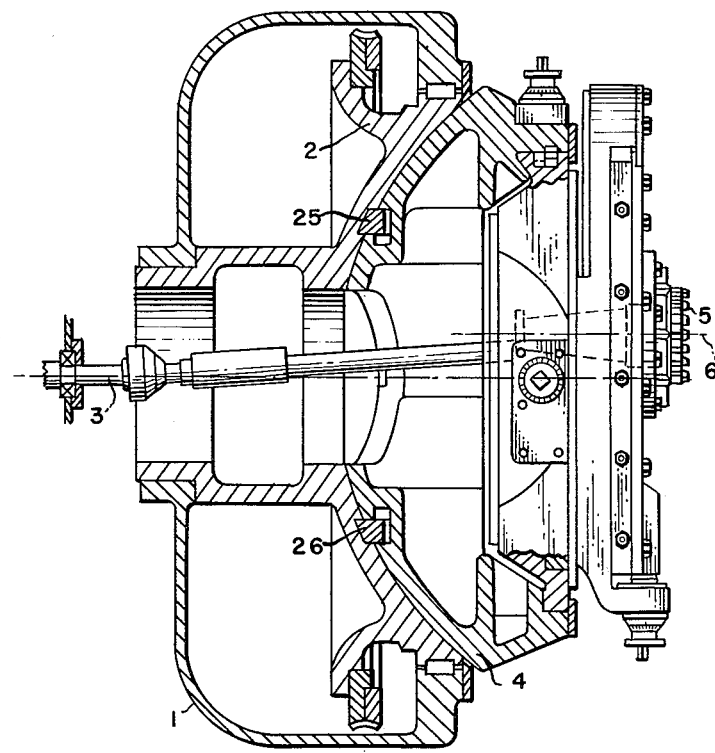
FIG. 7
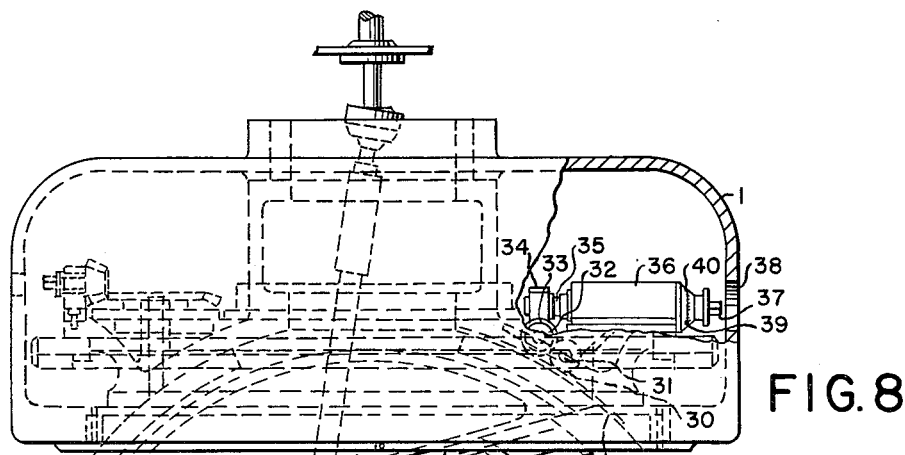
FIG. 8
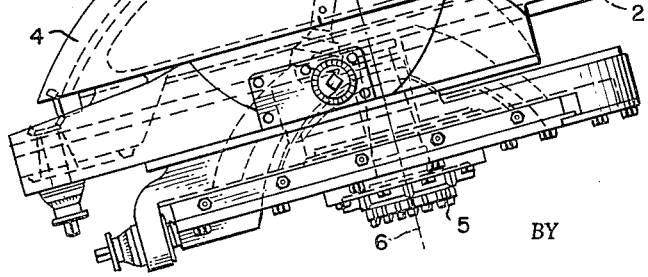
INVENTOR
JAIME PICANOL
BY
Richards & Geier
ATTORNEYS July 17, 1962   J. PICANOL   3,044,365

MACHINES FOR CUTTING BEVEL, HYPOID AND SIMILAR GEARS

Filed Aug. 11, 1958   4 Sheets-Sheet 4

INVENTOR
JAIME PICANOL

BY   *Richards & Geier*

ATTORNEYS

3,044,365
MACHINES FOR CUTTING BEVEL, HYPOID AND SIMILAR GEARS
Jaime Picanol, Casa Pairal Catalunya Zandberg, Zillebeke-lez-Ypres, Belgium
Filed Aug. 11, 1958, Ser. No. 754,357
Claims priority, application Belgium Mar. 8, 1958
5 Claims. (Cl. 90—5)

All persons conversant with the technique of cutting bevel gears of any type by generation know that one of the conditions to be fulfilled for a theoretically accurate cut is that the pitch plane of the basic crown be a plane which is perpendicular to the axis of the machine cradle.

They also know as a fact that gear teeth cut on one of the many machines which do not permit of this condition being fulfilled, show a slight excess of camber. This state of affairs results from the very design of the machine which, presumably for simplicity's sake, has been constructed in such manner that the tangent plane to the tooth bottom cone is held permanently perpendicular to the axis of the cradle. The result is that the basic-crown pitch plane is, in fact, a cone and that the tangent plane to this cone, which for facility's sake will be called the pitch plane is displaced by an angle δ in the direction of the machine. But as this angle is in fact the clearance angle of the gear which is being cut, it is infinitely variable.

Consequently, no means are available for controlling the excessive camber of the tooth, which must thus be taken as it is.

A proper control of this excess camber is however highly desirable, because this excess gives rise to a localization of the bearing area in the direction of the tooth height. It is thus important to be able to increase or diminish this bearing area according to requirements.

There are certainly some machines which permit of such control, but the means used to this end imply corrections of the various adjustments, corrections which can only be determined by long and arduous calculations exceeding the possibilities of most operatives and can only be mastered by some few experts.

The present invention aims at introducing such improvements to the machines for cutting bevel, hypoid and similar gears, and to provide a means which, amongst other advantages, controls in an easy and effective way the bearing area in the direction of the tooth height.

Substantially, these improvements consist in inserting, between the cradle and the toolhead of the machine, an additional support capable of undergoing an angular displacement about an axis perpendicular to the axis of the cradle. The axis of rotation of aforesaid additional support is perpendicular to aforesaid cradle at the point of intersection of the latter with the axis about which the headstock swings.

The cradle is defined as that part of the machine which imparts to the tool the movement needed for producing the required generation. The cradle also carries various supports of which the last one is the tool-holder. Aforesaid intermediate supports between the cradle and the tool-holder may comprise fixed supports and movable and/or adjustable supports whose object it is to put the tool in its correct initial position and to impart to it such movements as are needed for effecting the required cut.

Following the introduction of this complementary support which can be given an angular displacement, it becomes possible to alter in an easy way the cutting pitch so as to control at will the excess camber and, ipso facto, to do away with the main drawback of the machines under consideration.

It should be obvious that this additional support which can be subjected to an angular displacement can be designed and constructed in quite a number of ways depending on the type of machine and on the required results.

It is thus merely by way of example that additional information is given below, both with respect to the actual improvements, subject of the invention, as to one practical embodiment of the latter, with reference to the appended drawings, of which:

FIGURE 1 represents as schematically as possible a machine to which the improvements, subject of the invention, can be applied;

FIGURES 2 to 6 schematize several particular positions of the additional support which can be subjected to an angular displacement and constitutes the main object of the invention;

FIGURE 7 is a radial section of the head of the machine as improved according to the present invention;

FIGURE 8 is a top view with partial section of the tool-holder head represented in FIGURE 7;

Figure 1:
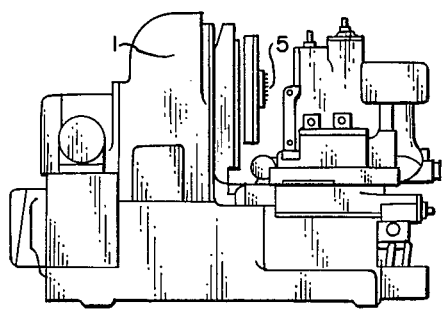

FIGURES 2 to 6 represent in a very summary way and, for the sake of clearness, only part of the frame 1; the usual cradle 2 and its axis 3; the additional support 4 which can be subjected to an angular displacement and constitutes the essential characteristic of the invention; the tool 5 and its axis 6; the gear blank 7 or 7'; its axis 8; the generating pitch crown 9; the pitch plane 10; the tooth bottom plane 11 and the pitch apex or center 12 of the machine which is the intersection of the cradle axis and headstock axis of the swing.

The additional support 4 is shown in a position ready for effecting by generation a theoretically correct cut of a bevel gear or pinion 7 with full bearing area.

Figure 2:
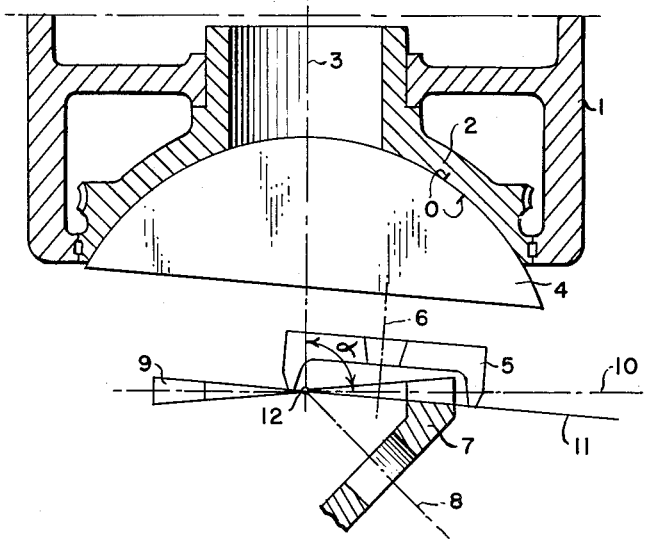

With this aim in view, as shown schematically in this same FIGURE 2, the gear cutting machine is adjusted in such way that the pitch plane 10 be perpendicular to the axis 3 of the cradle 2. By means of this arrangement, the bearing area extends over the whole length of the teeth of the gear and pinion which are to mesh together.

If the additional support 4 is moved gradually in such way as to reduce the angular displacement α between the pitch plane 10 and the axis 3 of the cradle (this movement being of course accompanied by a similar angular displacement of the headstock and by a corresponding change in the angular speed ratio between the cradle 2 and the blank 7) the result is that the camber of the teeth increases, and consequently that the bearing area shrinks more and more in the direction of the tooth height.

Figure 3:
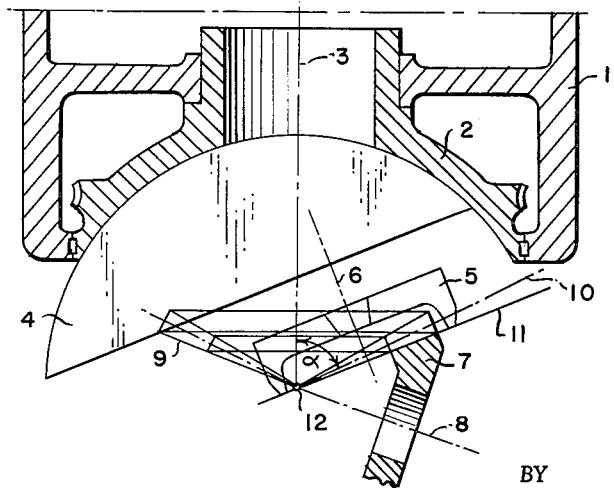

FIGURE 3 schematizes an angular position of the additional support 4 corresponding to a reduction in the height of the bearing area. As this latter has probably been predetermined, it can quite easily be obtained by a particularly simple and quick adjustment of the machine.

This correction of the bearing area could obviously be applied either to one or to both members of the gear intended to mesh together, i.e. the gear and the pinion.

The introduction of the additional support 4 into the mechanism of the gear cutting machine also facilitates the cutting of meshing bevel gears by applying the well known method according to which one of the gears of the couple—either the gear or the pinion—and generally the former, is cut without generation while the other member of the couple—generally the pinion—is being generated as an envelope of the former. In this case, the reduction of the bearing area is brought about by applying a correction only to the outline of the teeth of the member cut by generation, generally the pinion.

Figure 4:
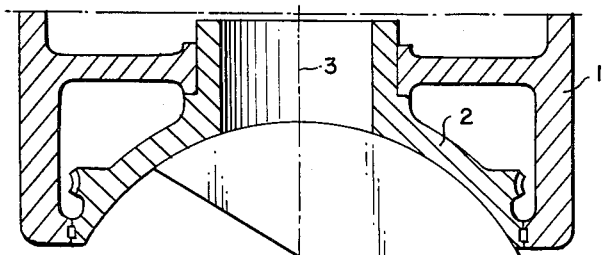
Figure 5:
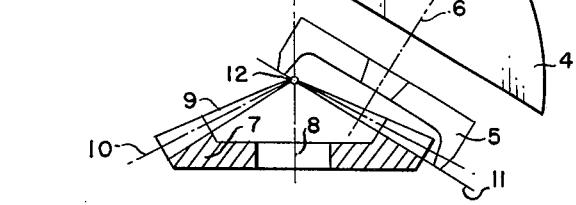

FIGURES 4 and 5 schematize characteristic positions of the additional support 4 for cutting respectively by this method in this particular instance, the gear and the pinion of the pair.

As schematized in FIGURE 4, all that is necessary to do for cutting (without generation) gear 7, is to give an angular displacement to the additional support 4 in order to bring the axis 8 of the blank 7 into a colinear position with axis 3 of the cradle 2. In correlation with this, as represented in FIGURE 5, in order to cut the pinion 7' which is to mesh aforesaid gear 7, the additional support 4 is given an angular displacement in such way that the basic-crown 9 be identical to the pinion cut without generation, as shown in FIGURE 4.

If the gear 7 and the pinion 7' are cut respectively as schematized in FIGURES 4 and 5, the bearing area extends over the whole height of the tooth. By the device which is the subject of the present invention, this area can however be easily made smaller. All that is necessary to do so is to change appropriately the angular displacement of the additional support 4, to adjust the machine so that the generating basic-crown becomes smaller than the smallest gear which is to be cut without generation, according to the above-described method, to move accordingly the headstock which carries the blank and to alter the speed ratio between the latter and the cradle.

Figure 6:
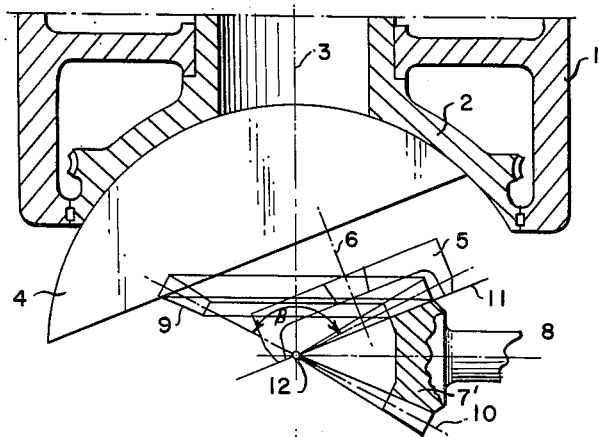

FIGURE 6 shows such a characteristic position of the additional support 4. In this sketch, all the elements of FIGURE 5 are reproduced, the difference being that the angle $\beta$ of the crown of aforesaid FIGURE 5 has become the angle $\gamma$ in FIGURE 6 and that this change is such that: $\gamma<\beta$. By means of this adjustment, the bearing area of the teeth is reduced in height.

All that was said above also applies when cutting by generation, pairs of bevel gears with non-radial teeth, such as gears with straight helical teeth or spiral gears, but only at the mean point of the teeth. Toward the ends of the teeth, camber also occurs, but no longer at the pitch circle. In fact, a shift can be noticed, on the one hand toward the tip of the tooth and on the other hand, toward the bottom. The result is that the camber occurs obliquely with respect to the general direction of the tooth, which fact can be excellently made use of for correcting an oblique bearing surface and constitutes the simplest remedy which has been found yet.

Concerning the practical application of the characteristics which are the subject of the invention, and more particularly of the additional support 4, the latter can be constructed, guided, displaced, adjusted and clamped in any appropriate way, the means employed to that end being a matter to be decided by the professionals.

One example of such means is illustrated, as far as its main elements are concerned, in FIGURES 7 to 10, some of these elements being the frame 1, the cradle 2 and its axis of rotation 3, the additional support 4 which can be given an angular displacement, the tool 5 and its axis of rotation 6.

In one original embodiment, aforesaid additional support 4 which can be given an angular displacement, is combined with an original clamping system and a drive fitted with a device by means of which it is possible to check visually any changes introduced into the position of aforesaid support.

Figure 9:
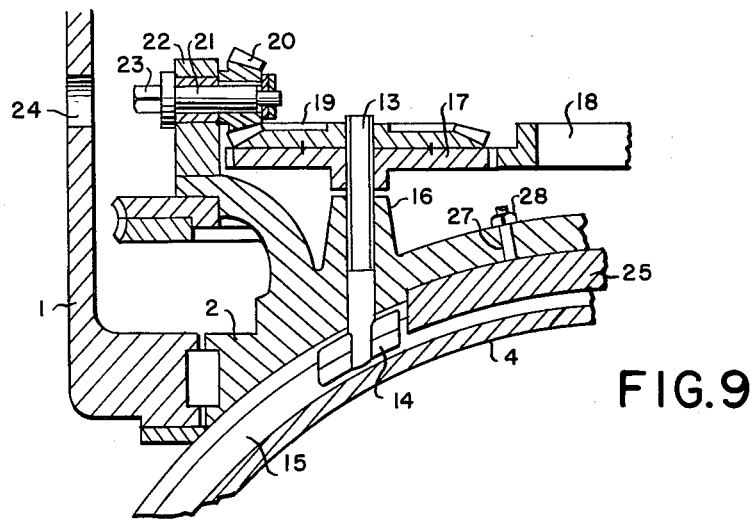
FIGURE 9 represents schematically the main elements used for clamping the additional support, which latter is the characteristic element of the present invention.
Figure 10:
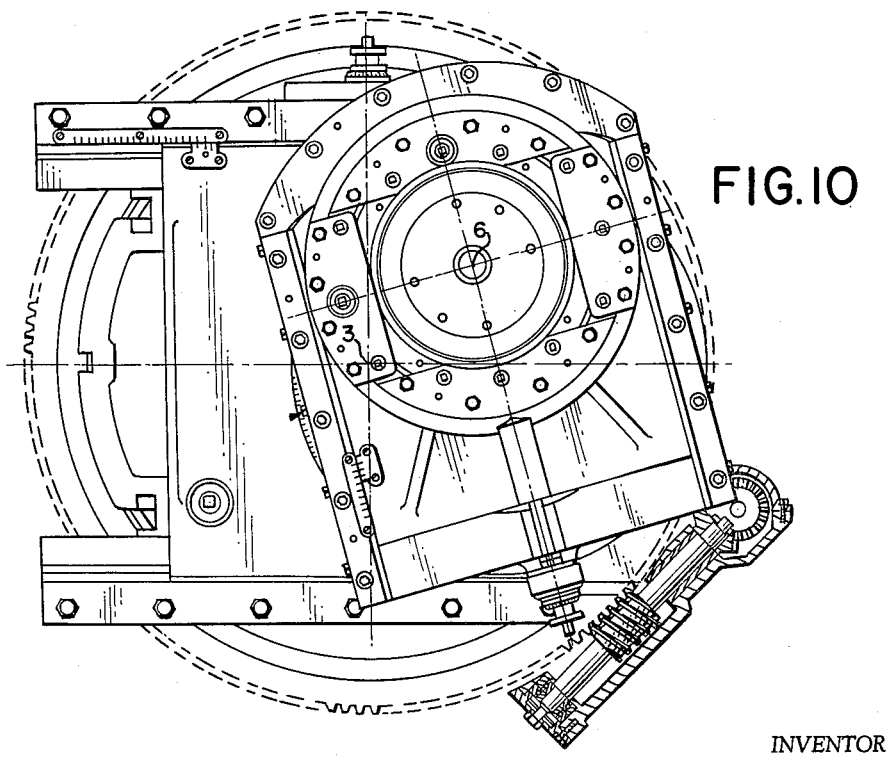
FIGURE 10 is a front view of that part of the machine represented in FIGURE 7, after the tool has been removed.

The original clamping device, which is illustrated in greater detail in FIGURES 8 and 9, consists of a certain number of threaded rods or bolts 13, one end 14 of which is specially shaped and engages a slot 15 of aforesaid support 4. These various rods are all parallel and each one extends through a bush 16 integral with the cradle 2. On the projecting free end of each bolt 13 a nut 17 is provided which has the characteristic shape of a gear with external teeth. The various gearnuts are made integral by means of a central crown wheel 18 with external teeth.

One of the nuts 17 carries a bevel gear 19 which permanently engages a bevel pinion 20 whose axis 21 is supported in a journal 22 and ends in a square 23. In a certain position of the cradle 2, this square comes to stand in front of a window 24 specially provided in the frame 1 in order to render aforesaid square end 23 easily accessible by means of a tubular wrench so as to make it possible to turn pinion 20 and anything which depends on the latter, one way or the other according to whether it is required to clamp or to release the movable system which it controls. These bolts or threaded rods 13 shall be uniformly spaced so as to divide the strain equally over aforesaid support 4.

The systems for guiding, clamping, driving and indexing are constructed in the following way, as shown schematically in FIGURES 7, 8 and 9. Proper guiding is effected by strips 25—26 fastened to the cradle 2 by bolts 27 and nuts 28, which strips are on the other hand a sliding fit in aforesaid slots 15.

The driving device consists of a rack 29 and pinion 30 which are permanently engaged. On aforesaid axis of the pinion, there is a second pinion 31 engaging gear 32 whose axis carries a helical gear 33. The latter engages the worm 34 mounted on an axis 35. This axis goes right through a long tubular bearing 36 and ends in a square head 37 located in front of an appropriate window 38 specially provided in the frame 1. As indexing or recording means, aforesaid axis 35 carries a calibrated circular conical scale 39 which is easily visible through aforesaid window 38 and can be moved in front of a fixed reference mark or scale 40.

On the other hand, in connection with this driving and recording system, the additional support 4 which can be given an angular displacement, carries a reference mark "O," and so does cradle 2. This guiding, driving and recording system could also be fitted with a revolution counter (not represented). Moreover, graduated scales and adequate reference marks could be fitted in various other places, such for instance as the curved preferably spherical bearing surface of aforesaid additional support 4.

An altogether different design could be thought of, the additional support which can be given an angular displacement, essential to the invention, being applicable to practically any machine designed for cutting bevel and similar gears by generation.

What I claim is:

1. In a machine for cutting by generation bevel, hypoid and similar gears, in combination with a swingable headstock, a cradle, a tool-holder of the machine and means for localizing and orienting said tool-holder; an additional support mounted on said cradle and positioned between said cradle and said tool-holder and means for angularly displacing and regulating said support about an axis perpendicular to the axis of the cradle and extending through the point of intersection of the axis of the cradle with the axis about which the headstock swings, wherein said support has at least one shaped slot, said machine further comprising a number of bolts with shaped heads reaching into aforesaid slot; gearnuts on aforesaid bolts; a crown wheel engaging simultaneously all said gearnuts; a bevel gear fixed to one of aforesaid gearnuts and engaging this bevel gear, and a bevel pinion the axis of which has a square end, said bevel pinion being movable in front of a sighting window of the frame.

2. In a machine for cutting by generation bevel, hypoid and similar gears, in combination with a swingable headstock, a cradle, a tool-holder of the machine and means for localizing and orienting said tool-holder; an additional support mounted on said cradle and positioned between said cradle and axis tool-holder and means for angularly displacing and regulating said support about an axis perpendicular to the axis of the cradle and extending through the point of intersection of the axis of the cradle with the axis about which the headstock swings.

3. In a machine for cutting by generation bevel, hypoid and similar gears, in combination with a swingable headstock, a cradle, a tool-holder of the machine and means for localizing and orienting said tool-holder; an additional support mounted on said cradle and positioned between said cradle and said tool-holder, said support being in contact with said cradle along a cylindrical surface the axis of which is perpendicular to the axis of the cradle at the point of intersection of the latter axis with the axis about which the headstock swings and means for angularly displacing and regulating said support along said cylindrical surface.

4. In a machine for cutting by generation bevel, hypoid and similar gears, in combination with a swingable headstock, a cradle, a tool-holder of the machine and means for localizing and orienting said tool-holder; an additional support mounted on said cradle and positioned between said cradle and said tool-holder, said support being in contact with said cradle along a spherical surface, the longitudinal axis of rotation of which is perpendicular to the axis of the cradle at the point of intersection of the latter axis with the axis about which the headstock swings and means for longitudinally displacing and regulating said support along said spherical surface.

5. In a machine for cutting by generation bevel, hypoid and similar gears, in combination with a swingable headstock, a cradle, a tool-holder of the machine and means for localizing and orienting said tool-holder; an additional support mounted on said cradle and positioned between said cradle and said tool-holder, said support having an elongated slot formed therein, means for angularly displacing said support along a cylindrical surface the axis of which is perpendicular to the axis of the cradle at the point of intersection of the latter axis with the axis about which the headstock swings, and at least one strip connected to said cradle and slidably engaging said slot, whereby said support is guided in said cylindrical surface.

References Cited in the file of this patent

UNITED STATES PATENTS

| | | |
|---|---|---|
| 1,964,800 | Hill | July 3, 1934 |
| 2,024,747 | Samek | Dec. 17, 1935 |
| 2,499,842 | Armitage | Mar. 7, 1950 |
| 2,521,231 | Larson | Sept. 5, 1950 |
| 2,667,818 | Stewart et al. | Feb. 2, 1954 |
| 2,835,172 | Barker et al. | May 20, 1958 |